A. P. STROHMENGER.
ELECTRIC FUSION OF METALS.
APPLICATION FILED SEPT. 25, 1913.
1,085,951.
Patented Feb. 3, 1914.
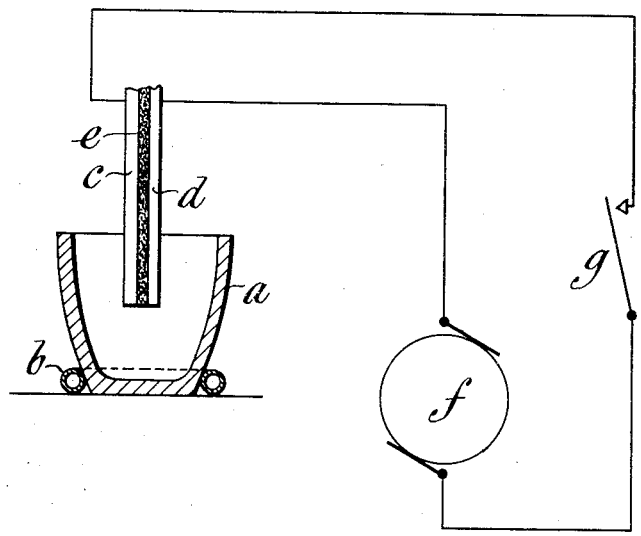
Witnesses.
M. E. Burrell
C. F. Early.
Inventor.
Arthur Percy Strohmenger
By his Attorneys
Baldwin Wight

UNITED STATES PATENT OFFICE.

ARTHUR PERCY STROHMENGER, OF WESTMINSTER, LONDON, ENGLAND, ASSIGNOR TO ESTER AND COMPANY, LIMITED, OF LONDON, ENGLAND.

ELECTRIC FUSION OF METALS.

1,085,951.  Specification of Letters Patent.  Patented Feb. 3, 1914.

Application filed September 25, 1913. Serial No. 791,853.

*To all whom it may concern:*

Be it known that I, ARTHUR PERCY STROHMENGER, a subject of the King of Great Britain, residing at Caxton House, Westminster, London, England, have invented a new and useful Improvement in the Electric Fusion of Metals, of which the following is a specification.

This invention relates to the preparation of metals and alloys and is especially applicable to the manufacture of high grade steel in which it is necessary that the composition should be absolutely definite and that the homogeneity should be perfect. According to this invention I maintain an electric arc between two rods or bars of metal which are separated by fusible insulating material and are arranged above a crucible (which is preferably heated) in such a way that the metal fused by the heat of the arc may drop into and be collected in the crucible while the insulating material, which is fused by the heat of the arc forms a slag.

The rods or bars are preferably arranged parallel one to the other. In some cases the two rods or bars may be of the same material and the impurities contained therein will be volatilized so that the product will be free from such impurities. In some cases also the alloying ingredients may be included in the insulating substance. For instance, if it be desired to produce a steel containing vanadium, titanium, or tungsten, these bodies may be included as powders, preferably as powders of their ferro-alloys, in the insulating substance.

The operation may if desired be conducted in an atmosphere of gas which will not combine with the metals. In some cases moreover more than two rods or bars may be employed.

It will be seen that as the metal is fused little by little the resulting product will be perfectly homogeneous.

The accompanying diagram illustrates the process.

$a$ is a crucible heated by a gas ring $b$; $c\ d$ are two bars of metal separated by insulating material $e$ and connected to the poles of a dynamo $f$ in circuit with a key $g$.

The insulating material employed may be asbestos mixed with a suitable composition such as sodium or aluminium silicate.

What I claim is:—

1. The process for fusing metals, which consists in connecting two rods of metal, one to each of the poles of a source of electricity, placing between the rods fusible insulating material adapted to form a slag, passing an arc between their ends and collecting the fused metal as it drops.

2. The process for fusing metals, which consists in placing two rods of metal parallel to one another, placing between them a layer of fusible insulating material adapted to form a slag, connecting the rods one to each of the poles of a source of electricity, passing an arc between their ends and collecting the fused metal as it drops.

3. The process for fusing metals, which consists in placing two rods of metal parallel to one another, placing between them a layer of fusible insulating material adapted to form a slag, and containing alloying ingredients, connecting the rods one to each of the poles of a source of electricity, passing an arc between their ends and collecting the fused metal as it drops.

4. The process for fusing metals, which consists in placing two rods of metal parallel to one another, placing between them a layer of fusible insulating material adapted to form a slag, connecting the rods one to each of the poles of a source of electricity, passing an arc between their ends and collecting and heating the fused metal as it drops.

ARTHUR PERCY STROHMENGER.

Witnesses:
 GEO. B. BUTT,
 J. S. REVILL.